(12) United States Patent
Takamatsu

(10) Patent No.: US 10,824,065 B2
(45) Date of Patent: Nov. 3, 2020

(54) LIGHT SOURCE APPARATUS, IMAGE DISPLAY APPARATUS, AND OPTICAL UNIT

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 376 days.

(21) Appl. No.: 15/522,851

(22) PCT Filed: Sep. 11, 2015

(86) PCT No.: PCT/JP2015/004630
§ 371 (c)(1),
(2) Date: Apr. 28, 2017

(87) PCT Pub. No.: WO2016/075853
PCT Pub. Date: May 19, 2016

(65) Prior Publication Data
US 2017/0315432 A1    Nov. 2, 2017

(30) Foreign Application Priority Data

Nov. 12, 2014   (JP) .................................. 2014-229933

(51) Int. Cl.
*G03B 21/20* (2006.01)
*F21V 14/08* (2006.01)
(Continued)

(52) U.S. Cl.
CPC ............ *G03B 21/204* (2013.01); *F21V 14/08* (2013.01); *G03B 21/16* (2013.01); *H04N 9/31* (2013.01);
(Continued)

(58) Field of Classification Search
CPC .................................. G03B 21/16; F21V 9/30
See application file for complete search history.

(56) References Cited

U.S. PATENT DOCUMENTS

| 4,800,474 A * | 1/1989 | Bornhorst ............. F21S 10/007 |
| | | 362/293 |
| 6,604,830 B1 | 8/2003 | Chiu et al. |
| 2004/0032572 A1 | 2/2004 | Chin et al. |

FOREIGN PATENT DOCUMENTS

| CN | 101529922 A | 9/2009 |
| JP | 2003-057424 A | 2/2003 |

(Continued)

OTHER PUBLICATIONS

Office Action for CN Patent Application No. 201580059923.7, dated Nov. 14, 2018, 07 pages of Office Action and 11 pages of English Translation.

(Continued)

*Primary Examiner* — Joseph L Williams
*Assistant Examiner* — Jacob R Stern
(74) *Attorney, Agent, or Firm* — Chip Law Group

(57) ABSTRACT

This light source apparatus includes a wheel, a motor, a rotation member, and a contact member. The wheel includes a light emitter that is excited by excitation light and emits visible light, and a base that includes a first surface and a second surface opposite thereto, supports the light emitter on either one of the first and second surfaces, and has a first linear expansion coefficient. The motor generates rotational force for rotating the base. The rotation member is connected to the first surface of the base, rotates integrally with the base due to the rotational force of the motor, and has a second linear expansion coefficient different from the first linear expansion coefficient. The contact member is connected to the second surface of the base and has a third linear expansion coefficient whose magnitude relationship to the first linear expansion coefficient is equal to a magnitude relationship of the second linear expansion coefficient to the first linear expansion coefficient.

12 Claims, 12 Drawing Sheets

(51) Int. Cl.
*F21V 9/16* (2006.01)
*H04N 9/31* (2006.01)
*G03B 21/16* (2006.01)
*G03B 33/12* (2006.01)

(52) U.S. Cl.
CPC ......... *H04N 9/3141* (2013.01); *H04N 9/3158* (2013.01); *H04N 9/3161* (2013.01); *G03B 33/12* (2013.01)

(56) References Cited

FOREIGN PATENT DOCUMENTS

| | | |
|---|---|---|
| JP | 2006-047836 A | 2/2006 |
| JP | 2006-323118 A | 11/2006 |
| JP | 2010-501883 A | 1/2010 |
| JP | 2011-070882 A | 4/2011 |
| JP | 2014-085623 A | 5/2014 |
| WO | 2014064877 A1 | 5/2014 |

OTHER PUBLICATIONS

Office Action for JP Patent Application No. 2016-558856, dated Jul. 2, 2019, 05 pages of Office Action and 04 pages of English Translation.

* cited by examiner

LIGHT SOURCE APPARATUS, IMAGE DISPLAY APPARATUS, AND OPTICAL UNIT

CROSS REFERENCE TO RELATED APPLICATIONS

This application is a U.S. National Phase of International Patent Application No. PCT/JP2015/004630 filed on Sep. 11, 2015, which claims priority benefit of Japanese Patent Application No. JP 2014-229933 filed in the Japan Patent Office on Nov. 12, 2014. Each of the above-referenced applications is hereby incorporated herein by reference in its entirety.

TECHNICAL FIELD

The present technology relates to an image display apparatus such as a projector and to a light source apparatus and an optical unit that are applicable thereto.

BACKGROUND ART

Conventionally, image display apparatuses such as projectors have been widely used. For example, light from light sources is modulated by a light modulator such as a liquid-crystal device and the modulated light is projected to a screen or the like, such that an image is displayed. Mercury-vapor lamps, xenon lamps, LEDs (Light Emitting Diodes), LDs (Laser Diodes), and the like are used as the light sources. Among them, solid-state light sources such as the LEDs and LDs have long lifetimes and do not require frequent lamp replacement unlike the conventional case. Further, it is advantageous in that they light up immediately after powered on.

For example, Patent Literature 1 describes a light source apparatus using a plurality of laser light sources and an image display apparatus using the same. In the light source apparatus described in Patent Literature 1, blue laser light emitted from a light source section is collected to a predetermined point on a phosphor of a phosphor wheel as shown in FIG. 3 thereof. The phosphor is excited by blue laser light and generates yellow fluorescence. Further, the phosphor transmits part of blue laser light. Thus, white light that is a combination of blue laser light and yellow light is emitted from a phosphor wheel (paragraphs [0035] to [0039], etc. of Patent Literature 1).

CITATION LIST

Patent Literature

Patent Literature 1: Japanese Patent Application Laid-open No. 2014-085623

DISCLOSURE OF INVENTION

Technical Problem

In the light source apparatus using solid-state light sources as described in Patent Literature 1, the number of solid-state light sources can be increased or the luminance of the solid-state light sources themselves can be increased, for example, in order to increase the luminance of the projector. If do so, the amount of heat generation from the phosphor which receives light emitted from the solid-state light sources increases and there is a possibility that the reliability of the phosphor wheel may be lowered.

In view of the above-mentioned circumstances, it is an object of the present technology to provide a light source apparatus, an image display apparatus, and an optical unit by which the reliability of a phosphor wheel can be prevented from being lowered due to an increase in temperature.

Solution to Problem

In order to accomplish the above-mentioned object, a light source apparatus according to an embodiment of the present technology includes a wheel, a motor, a rotation member, and a contact member.

The wheel includes a light emitter that is excited by excitation light and emits visible light, and a base that includes a first surface and a second surface opposite thereto, supports the light emitter on either one of the first and second surfaces, and has a first linear expansion coefficient.

The motor generates rotational force for rotating the base.

The rotation member is connected to the first surface of the base, rotates integrally with the base due to the rotational force of the motor, and has a second linear expansion coefficient different from the first linear expansion coefficient.

The contact member is connected to the second surface of the base and has a third linear expansion coefficient whose magnitude relationship to the first linear expansion coefficient is equal to a magnitude relationship of the second linear expansion coefficient to the first linear expansion coefficient.

In this light source apparatus, the rotation member is connected to the first surface of the base in order to rotate the base of the wheel. On the other hand, the contact member is connected to the second surface of the base. Each of the linear expansion coefficients (first, second, and third linear expansion coefficients) of the base, the rotation member, and the contact member is set such that the magnitude relationship between the first and second linear expansion coefficients is equal to the magnitude relationship between the first and third linear expansion coefficients. With this, it becomes possible to suppress deformation of the base due to heat generation of the phosphor. As a result, it becomes possible to prevent the reliability of the wheel from being lowered due to an increase in temperature.

The light source apparatus may further include:
a light source that emits light; and
an emitting surface that emits combination light including emission light from the light source and visible light from the light emitter. In this case, the light emitter may emit the visible light, using part of the emission light from the light source as the excitation light.

This light source apparatus can emit high-luminance light.

The motor may include an applying member that applies the rotational force by rotating and has a fourth linear expansion coefficient. In this case, the rotation member may be connected to the applying member and have the second linear expansion coefficient that is a magnitude between the first linear expansion coefficient and the fourth linear expansion coefficient.

In this light source apparatus, the rotation member is connected to the applying member of the motor. Then, the second linear expansion coefficient of the rotation member is set to a magnitude between the first linear expansion coefficient of the base and the fourth linear expansion coefficient of the applying member. With this, the difference from the first linear expansion coefficient can be reduced and it becomes possible to suppress deformation of the base due to heat generation of the phosphor.

The rotation member may be a member that constitutes the motor.

That is, the base may be directly connected to the motor. Also in this case, the contact member is connected to the second surface of the base, and hence it is possible to prevent the reliability of the wheel from being lowered.

The rotation member and the contact member may be made of the same material.

With this, it is possible to sufficiently prevent the reliability of the wheel from being lowered.

Each of the base, the rotation member, and the contact member may be disposed such that a center of each of the base, the rotation member, and the contact member is positioned on a rotation axis of the motor.

With this, it is possible to sufficiently suppress deformation of the base. Further, it is possible to easily connect the rotation member and the contact member to the base.

The rotation member may be connected to a first region set with the center of the first surface being a reference. In this case, the contact member may be connected to a second region set with the center of the second surface being a reference, the second region having a size approximately equal to the first region.

With this, it is possible to sufficiently suppress deformation of the base. Further, it is possible to easily connect the rotation member and the contact member to the base.

A size and an outer shape of the rotation member as viewed in a direction of a normal of the first surface may be approximately equal to a size and an outer shape of the contact member as viewed in a direction of a normal of the second surface, respectively.

With this, it is possible to sufficiently suppress deformation of the base. Further, it is possible to easily connect the rotation member and the contact member to the base.

The contact member may be a rotor hub in which a correction material that corrects rotation balance of the wheel is capable of being placed.

The contact member may be thus used as the rotor hub. With this, it becomes possible to reduce the number of necessary components and costs for components can be reduced. Further, it is possible to simplify the configuration of the light source apparatus.

At least one of the rotation member and the contact member may be heat conductive.

With this, it is possible to suppress an increase in temperature of the wheel and to keep the reliability.

An image display apparatus according to an embodiment of the present technology includes a light source apparatus, an image generation system, and a projection system.

The light source apparatus includes the wheel, the motor, the rotation member, the contact member, and the emitting surface.

The image generation system includes an image generation element that generates an image on the basis of irradiated light, and an illumination optical system that irradiates the image generation element with light from the light source apparatus.

The projection system projects the image generated by the image generation element.

An optical unit according to an embodiment of the present technology includes the wheel, the motor, the rotation member, and the contact member.

Advantageous Effects of Invention

As described above, in accordance with the present technology, it is possible to prevent the reliability of a phosphor wheel from being lowered due to an increase in temperature. It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

[Image Display Apparatus]

Figure 1:
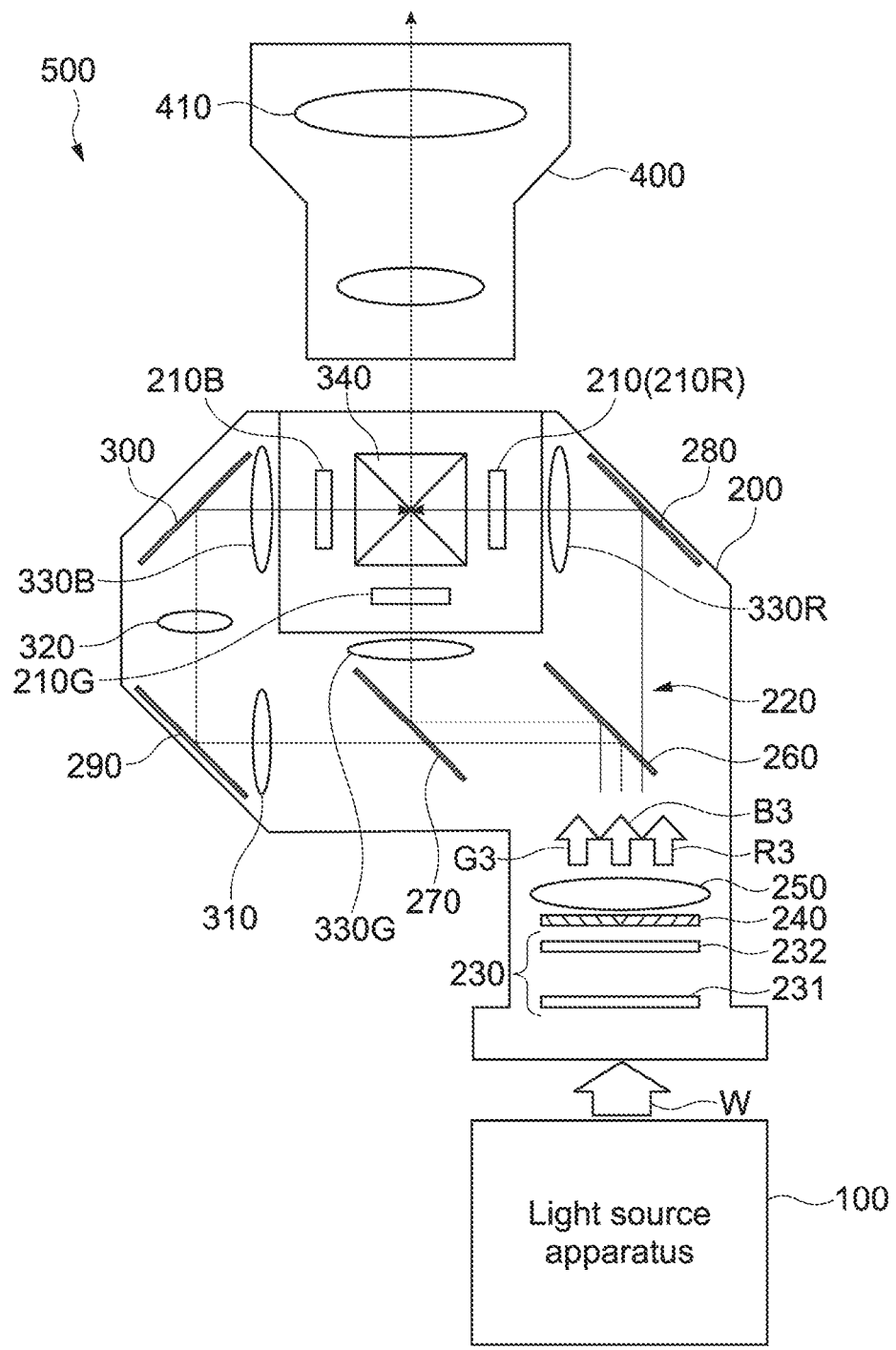
FIG. 1 A schematic diagram showing a configuration example of an image display apparatus according to an embodiment of the present technology.

FIG. 1 is a schematic diagram showing a configuration example of an image display apparatus according to an embodiment of the present technology. An image display apparatus 500 is used as a projector for presentation or digital cinema, for example. The present technology described below is also applicable to image display apparatuses used for the other purposes.

The image display apparatus 500 includes a light source apparatus 100, an image generator system 200, and a projection system 400. The light source apparatus 100 is capable of emitting light. The image generator system 200 generates an image, using light from the light source apparatus 100. The projection system 400 projects the image generated by the image generation system 200 to a screen (not shown) or the like.

The light source apparatus 100 emits white light W including red light, green light, and blue light. The light source apparatus 100 will be described later in detail.

The image generation system 200 includes an image generation element 210 that generates an image on the basis of the emitted light and an illumination optical system 220 that radiates the light emitted from the light source apparatus 100 to the image generation element 210. Further, the image generation system 200 includes an integrator element 230, a polarization conversion element 240, and a light collection lens 250.

The integrator element 230 includes a first fly eye lens 231 including a plurality of micro lenses two-dimensionally arranged and a second fly eye lens 232 including a plurality of micro lenses arranged corresponding to the micro lenses one by one.

The white light W entering the integrator element 230 from the light source apparatus 100 is divided by the micro lenses of the first fly eye lens 231 into a plurality of light fluxes and forms an image on each of the corresponding micro lenses in the second fly eye lens 232. Each of the micro lenses of the second fly eye lens 232 functions as a secondary light source. A plurality of parallel light beams having the same luminance are emitted to the polarization conversion element 240 as incident light.

The integrator element 230 functions, as a whole, to adjust the incident light, which is emitted from the light source apparatus 100 to the polarization conversion element 240, to have uniform luminance distribution.

The polarization conversion element 240 functions to equalize polarization states of the incident light entering via the integrator element 230 and the like. This polarization conversion element 240 emits white light including blue light B3, green light G3, and red light R3 via, for example, the light collection lens 250 or the like disposed on an emitting side of the light source apparatus 100.

The illumination optical system 220 includes dichroic mirrors 260 and 270, mirrors 280, 290, and 300, relay lenses 310 and 320, field lenses 330R, 330G, and 330B, liquid-crystal light bulbs 210R, 210G, and 210B as the image generation elements, and a dichroic prism 340.

The dichroic mirrors 260 and 270 have characteristics to selectively reflect color light having a predetermined wavelength region and allow light having other wavelength regions to pass therethrough. Referring to FIG. 1, for example, the dichroic mirror 260 selectively reflects the green light G3 and the blue light B3. The dichroic mirror 270 selectively reflects the green light G3 out of the green light G3 and the blue light B3 that are reflected by the dichroic mirror 260. The remaining blue light B3 passes through the dichroic mirror 270. With this, the light emitted from the light source apparatus 100 is separated into the plurality of different color light beams. Note that a configuration for separating the plurality of color light beams, a device to be used, and the like are not limited.

The separated red light R3 is reflected by a mirror 280, and then passes through a field lens 330R to thereby be parallelized. After that, such red light R3 enters a liquid-crystal light bulb 210R for modulation of the red light. The green light G3 passes through a field lens 330G to thereby be parallelized. After that, such green light G3 enters a liquid-crystal light bulb 210G for modulation of the green light. The blue light B3 is reflected by a mirror 290 through a relay lens 310 and further reflected by a mirror 300 through a relay lens 320. The blue light B3 reflected by the mirror 300 passes through a field lens 330B to thereby be parallelized. After that, such blue light B3 enters a liquid-crystal light bulb 210B for modulation of the blue light.

The liquid-crystal light bulbs 210R, 210G, and 210B are electrically connected to a signal source (not shown) (e.g., PC) that supplies an image signal including image information. The liquid-crystal light bulbs 210R, 210G, and 210B modulate, on the basis of the supplied color image signals, the incident light to generate a red image, a green image, and a blue image, respectively. The modulated color light beams (formed images) enter the dichroic prism 340 and are combined. The dichroic prism 340 superimposes and combines the color light beams entering in the three directions and emits them toward the projection system 400.

The projection system 400 projects the image generated by the image generation element 210. The projection system 400 includes a plurality of lenses 410 and the like and irradiates a screen (not shown) or the like with the light combined by the dichroic prism 340. Thus, a full-color image is displayed.

[Light Source Apparatus]

Figure 2:
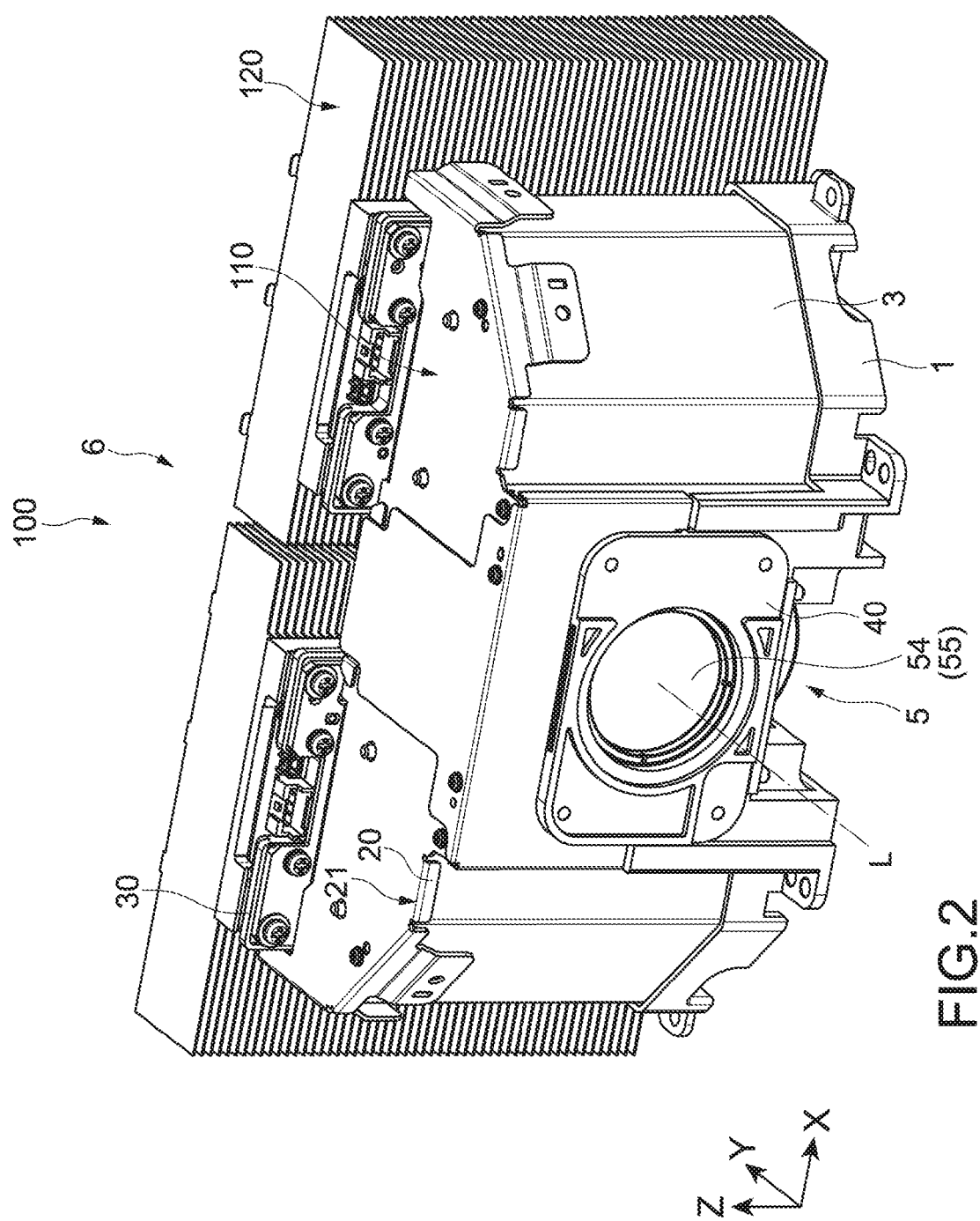
FIG. 2 A perspective view showing a configuration example of a light source apparatus.

FIG. 2 is a perspective view showing a configuration example of the light source apparatus 100. The light source apparatus 100 includes a light source section 110 that emits white light, and a heat sink 120 attached to the light source section 110. Assuming that a side on which the white light is emitted is a front side 5 and an opposite side thereof is a back side 6, the heat sink 120 is attached to the back side 6 of the light source section 110.

The light source section 110 includes a base portion 1 provided in the bottom portion and a housing portion 3 supported by the base portion 1. The base portion 1 has a shape long in one direction. A longitudinal direction of the elongated base portion 1 is left- and right-hand directions (x-axis direction) of the light source apparatus 100 and a lateral direction orthogonal to the longitudinal direction is front and rear directions (y-axis direction). Further, a direction orthogonal to both of the longitudinal direction and the lateral direction is a height direction (z-axis direction) of the light source apparatus 100.

A light source unit 30 and a phosphor unit 40 are mounted on the base portion 1. The light source unit 30 includes one or more solid-state light sources. The phosphor unit 40 receives light of the light source unit 30 and generates and emits white light. Inside the housing portion 3, laser light emitted from the one or more solid-state light sources is guided to the phosphor unit 40. Then, white light is generated by the phosphor unit 40 and the white light is emitted along an optical axis L. Note that the phosphor unit 40 corresponds to an optical unit according to this embodiment.

Figure 3:
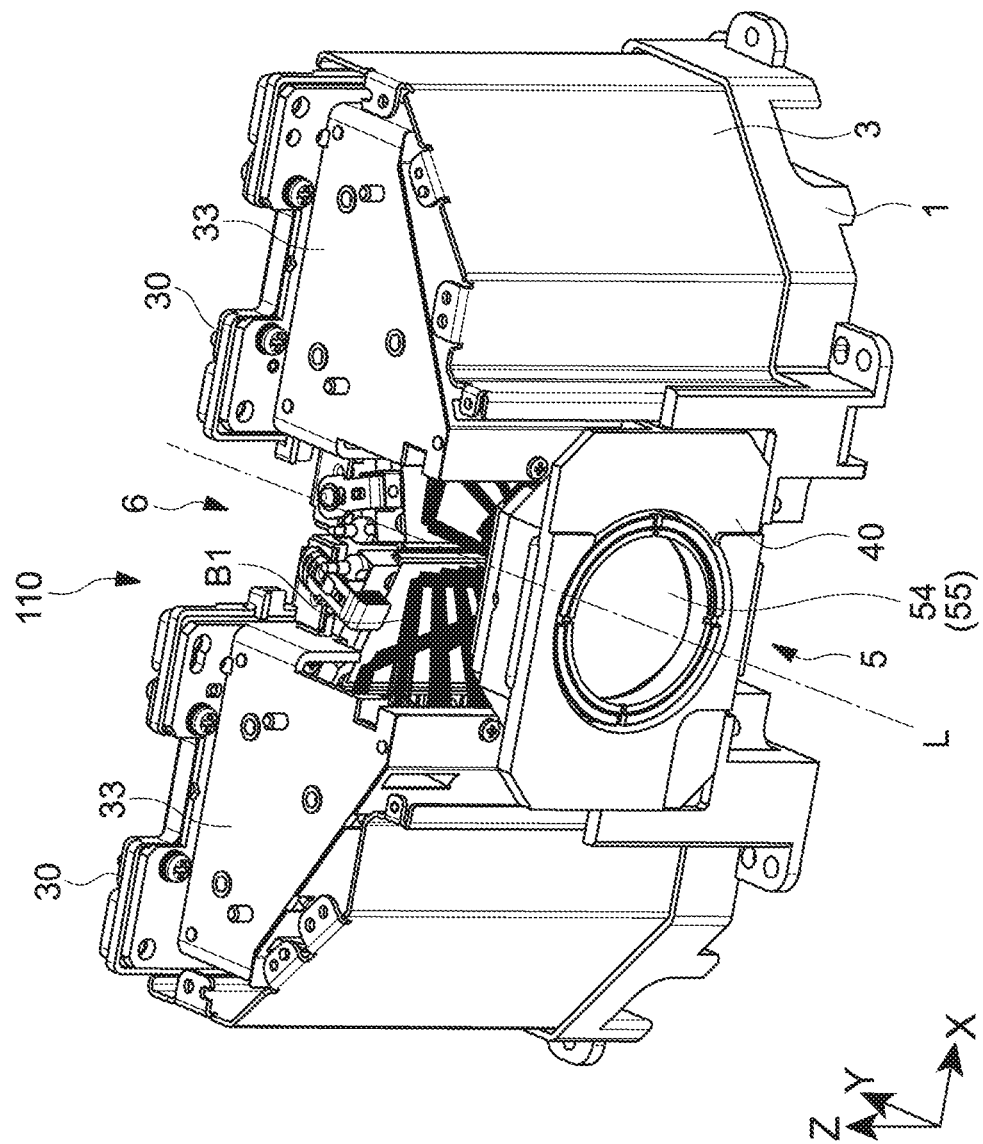
FIG. 3 A diagram of a state in which an upper surface portion of a light source section is detached.
Figure 4:
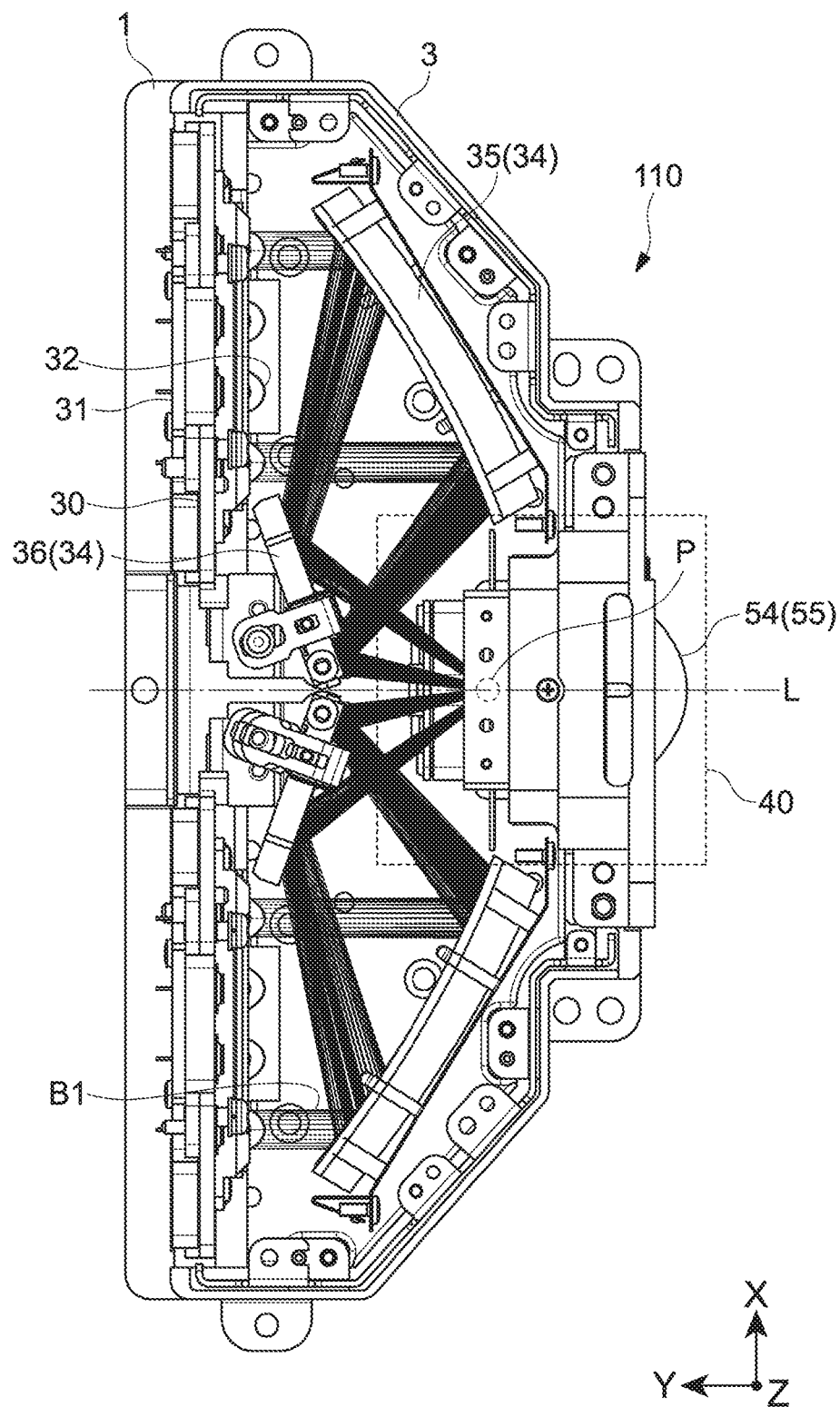
FIG. 4 A plan view of the light source section shown in FIG. 3 as viewed from the top.
Figure 5:
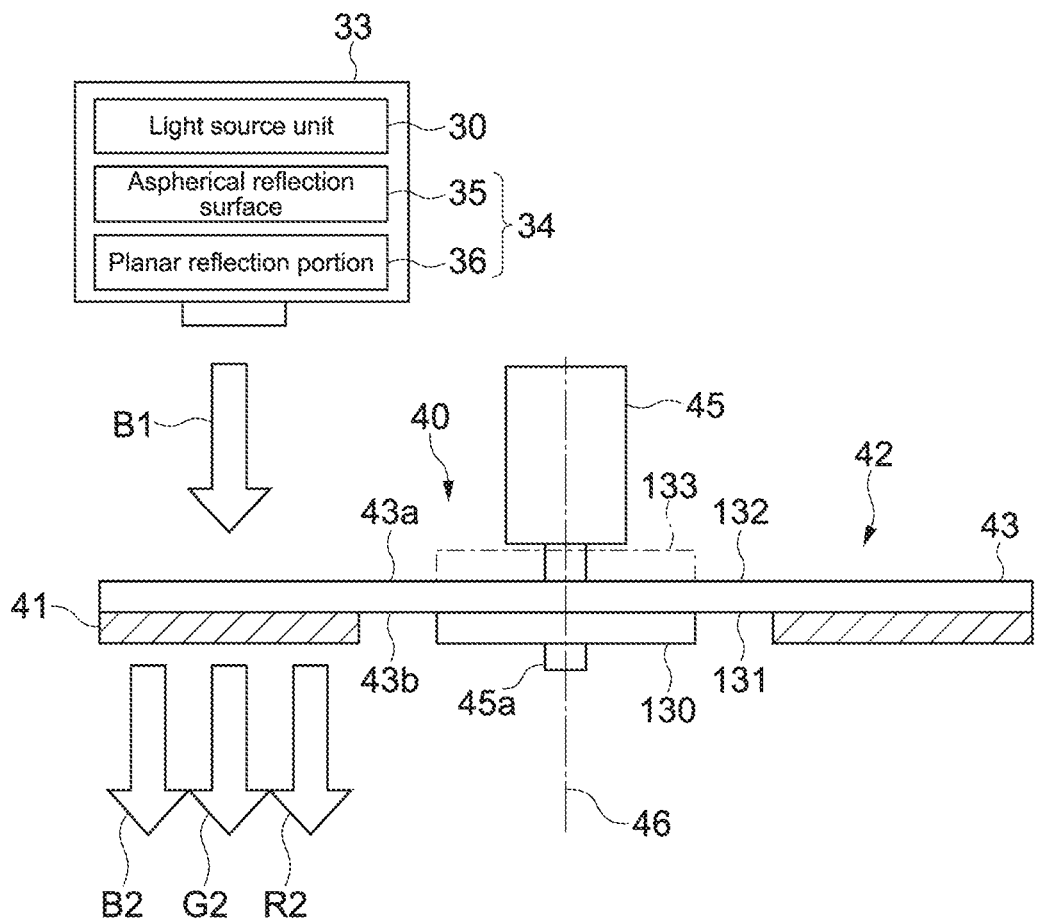
FIG. 5 A view for describing generation of white light by the light source section.

Referring to FIGS. 3 to 5, an internal configuration example of the light source section 110 and a generation example of the white light will be described. FIG. 3 is a diagram of a state in which the upper surface portion of the light source section 110 is detached. FIG. 4 is a plan view of the light source section 110 shown in FIG. 3 as viewed from the top.

As shown in FIGS. 3 and 4, on the back side 6 of the base portion 1, two light source units 30 are arranged in the longitudinal direction. Each of the light source units 30 includes a plurality of laser light sources (laser diodes) 31 mounted on a mounting substrate 31. The plurality of laser light sources 32 are arranged to be capable of emitting light toward the front side 5 with the front and rear directions being an optical axis direction.

In this embodiment, the plurality of laser light sources 32 are a blue-laser light sources capable of oscillating blue laser light B1 having a peak wavelength of emission intensity within a wavelength range of 400 nm to 500 nm, for example. The laser light sources may be replaced by other solid-state light sources such as LEDs. Further, also when the solid-state light sources may be replaced by mercury-vapor lamps, xenon lamps, or the like, the present technology is applicable.

In front of the two light source units 30, light collection optical systems 34 are arranged. The light collection optical system 34 collects the blue laser light B1 from the plurality of laser light sources 32 onto a predetermined point P of the phosphor unit 40. Note that FIG. 3 shows a frame 33 that supports the light source units 30 and the light collection optical system 34 as a single unit. In FIG. 4, the illustration of the frame 33 is omitted such that the light collection optical system 34 can be seen.

As shown in FIG. 4, the light collection optical system 34 includes an aspherical reflection surface 35 and a planar reflection portion 36. The aspherical reflection surface 35 reflects and collects light emitted from the plurality of laser light sources 32. The planar reflection portion 36 collects the light reflected by the aspherical reflection surface 35 to the predetermined point P of the phosphor unit 40. The predetermined point P is a point set on a phosphor layer of the phosphor unit 40.

As shown in FIG. 4, a direction of the optical axis L of the white light and an optical axis direction of the blue laser light B1 emitted from the plurality of laser light sources 32 are set to be the same direction. This enables a space for the heat sink 120 to be easily ensured on the back side 6 of the light source section 110. Then, the plurality of laser light sources 32 can be efficiently cooled from the back side 6.

FIG. 5 is a diagram for describing generation of the white light by the light source section 110. In FIG. 5, a phosphor wheel and a motor that are provided inside the phosphor unit 40 are schematically shown. Specific configurations of the phosphor wheel and the motor will be described later in detail (slightly different from FIG. 5).

A phosphor wheel 42 includes a disk-shaped substrate 43 that transmits the blue laser light B1 therethrough and a phosphor layer 41 disposed on the substrate 43. A crystalline member, for example, crystal or sapphire is used as the substrate 43. At the center of the substrate 43, a motor 45 that drives the phosphor wheel 42 is connected and the phosphor wheel 42 is provided to be rotatable about a rotation axis 46. The rotation axis 46 is located such that the predetermined point P of the phosphor layer 41 is positioned at approximately the center (on the optical axis L) of the phosphor unit 40.

The phosphor layer 41 contains a fluorescent substance that is excited by the blue laser light B1 and emits fluorescence. Then, the phosphor layer 41 converts part of the blue laser light B1 emitted by the plurality of laser light sources 32 into light (i.e., yellow light) in a wavelength region of a red wavelength region to a green wavelength region.

As the fluorescent substance of the phosphor layer 41, for example, a YAG (Yttrium Aluminum Garnet)-based phosphor is used. Note that the kind of fluorescent substance, a wavelength region of excited light, and a wavelength region of visible light generated by excitation are not limited.

Further, the phosphor layer 41 transmits part of the excitation light therethrough, such that the blue laser light B1 emitted from the plurality of laser light sources 32 can also be emitted. With this, light emitted from the phosphor layer 41 becomes white light due to the mixture of blue excitation light and yellow fluorescence. The part of the excitation light is transmitted, and hence, for example, filler particles that are light-transmissive particulate substances may be used.

While the substrate 43 is rotated by the motor 45, the blue laser light B1 is emitted from the laser light sources 32. The blue laser light B1 is radiated to the phosphor layer 41 in such a manner that it relatively draws a circle correspondingly to the rotation of the substrate 43. With this, the white light including blue laser light B2 that has been transmitted through the phosphor layer 41 and green light G2 and red light R2 that are the visible light from the phosphor layer 41 is emitted from the phosphor unit 40.

In this embodiment, the light-emitter layer 41 corresponds to a light emitter and the substrate 43 corresponds to a base. Further, the motor 45 functions as a motor that generates rotational force for rotating the base. Note that the configuration of the light source section 110 is not limited and may be appropriately designed.

[Phosphor Unit]

Figure 6:
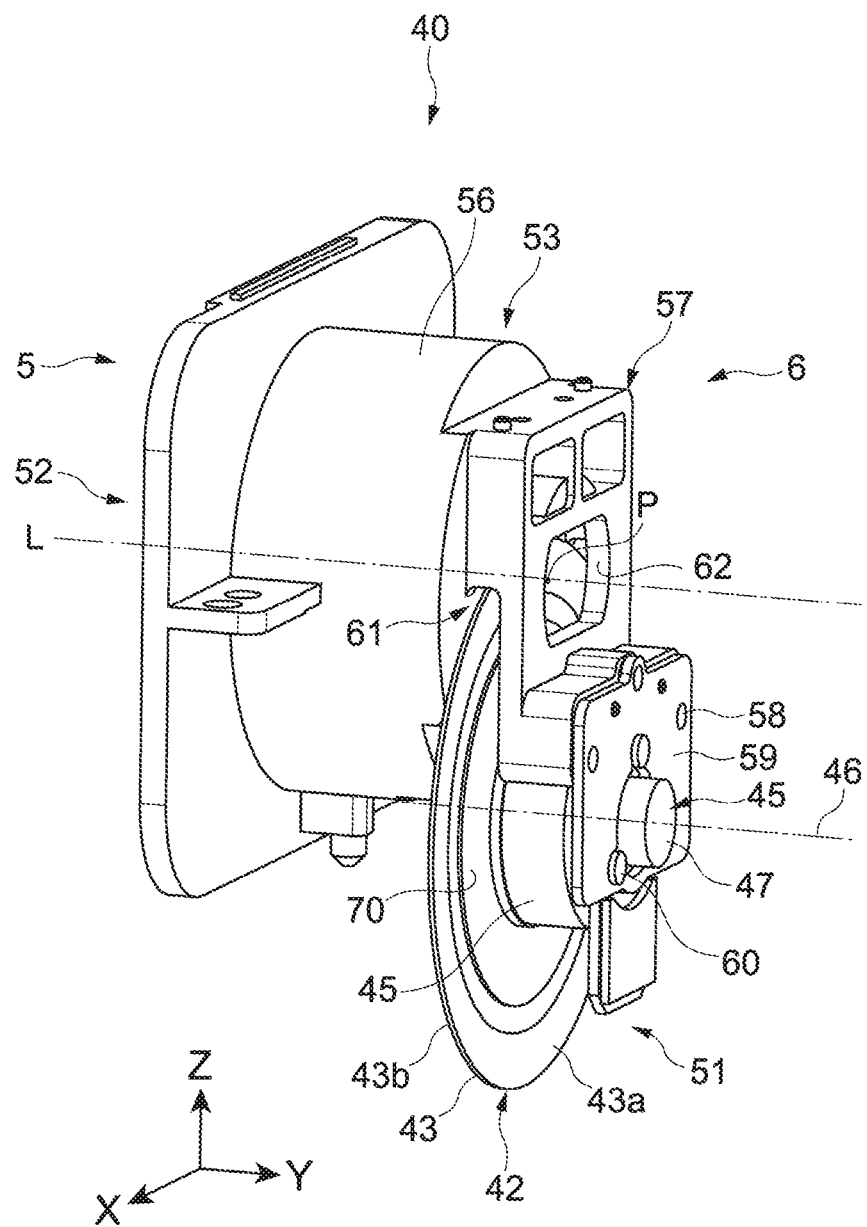
FIG. 6 A perspective view showing a specific configuration example of a phosphor unit.

FIG. 6 is a perspective view showing a specific configuration example of the phosphor unit 40 according to this embodiment. The phosphor unit 40 includes a wheel portion 51, a lens portion 52, and a holder portion 53 that supports the wheel portion 51 and the lens portion 52 as a single unit.

The wheel portion 51 includes the phosphor wheel 42, the motor 45, a rotation member 70, and a contact member (illustration thereof is omitted from FIG. 6). The phosphor wheel 42 includes the substrate 43. The substrate 43 includes a first surface 43a and a second surface 43b opposite thereto. In this embodiment, the first surface 43a is a surface on the back side 6 and the second surface 43b is a surface on a front side 5. The phosphor layer 41 is supported by the second surface 43b

The motor 45 is an outer rotor type motor. The motor 45 includes a stator 47 and a rotor 48 provided to cover the stator 47. When the motor 45 is supplied with electric power, the rotor 48 rotates with respect to the stator 47. Rotational force is thus generated. Note that the rotor 48 is, for example, made of metal such as aluminum. In this embodiment, the rotor 48 functions as an applying member that applies rotational force by rotating.

As shown in FIG. 6, the motor 45 is disposed on a side of the first surface 43a of the substrate 43. An end of the rotor 48 is connected to the center of the first surface 43a via the rotation member 70. At this time, the rotation axis 46 of the motor 45 is aligned with a normal passing through the center of the substrate 43. With this, the phosphor wheel 42 is made rotatable about the rotation axis 46 of the motor 45.

The rotation member 70 is connected to each of the first surface 43a of the substrate 43 and the rotor 48 of the motor 45. The contact member is connected to the second surface 43b of the substrate 43. Those rotation member 70 and contact member will be described later.

The lens portion 52 includes one or more lenses and an emitting surface 54 (see FIG. 2, etc.). The one or more lenses collect white light emitted from the wheel portion 51. The emitting surface 54 emits the collected white light. For example, the one or more lenses include an emitting lens 55 that constitutes the emitting surface 54. In addition, the number of lenses disposed as the one or more lenses, a lens size, a lens type, and the like are not limited.

The holder portion 53 includes a lens holding portion 56 that holds the one or more lenses and a wheel holding portion 57 that holds the wheel portion 51. The lens holding portion 56 has an approximately cylindrical shape extending on the back side 6 and houses the one or more lenses therein.

The wheel holding portion 57 is coupled to the back side 5 of the lens holding portion 56. The wheel holding portion 57 downwardly extends along the z-axis direction. A sheet metal 59 is fixed with screws 58 to an end of the wheel holding portion 57. The stator 47 of the motor 45 is fixed to this sheet metal 59 with screws 60. When the motor 45 is fixed to the wheel holding portion 57, the phosphor wheel 42 is inserted into a space 61 formed between a surface of the lens holding portion 56 on the back side and the wheel holding portion 57.

As shown in FIG. 6, an opening 62 is formed in the wheel holding portion 57. The blue laser light B1 emitted from the laser light sources 32 is collected to the predetermined point P of the phosphor layer 41 through the opening 62. Although it cannot seen from FIG. 6, an opening is also formed in the surface of the lens holding portion 56 on the back side. The white light is emitted from the phosphor wheel 42 to the lens portion 52 through this opening.

In this embodiment, the phosphor unit 40 is configured as a single unit and fixed to the base portion 1. With this, positioning of the lenses for light collection and the wheel including the light emitter can be easily and highly accurately realized within the phosphor unit 40. Further, in this embodiment, the center of the phosphor wheel 42 is held by the wheel holding portion 57 from above. With this, more exposed portions of the phosphor wheel 42 can be provided within the light source apparatus 100. As a result, heat from the phosphor layer 41 can be effectively cooled with cooling air or the like.

Figure 7:
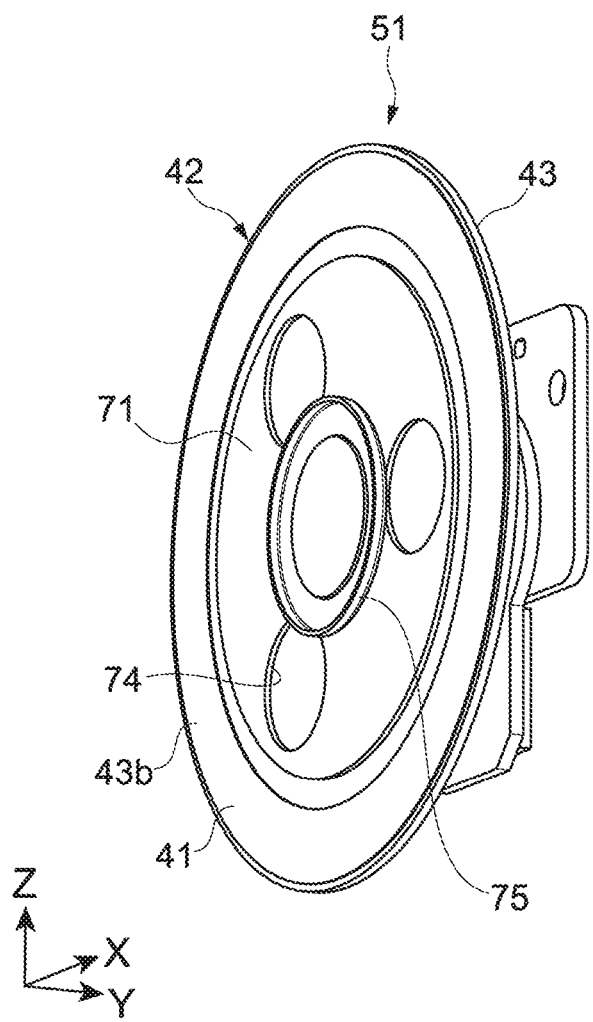
FIG. 7 A perspective view of a wheel portion as obliquely viewed from a front side.
Figure 8:
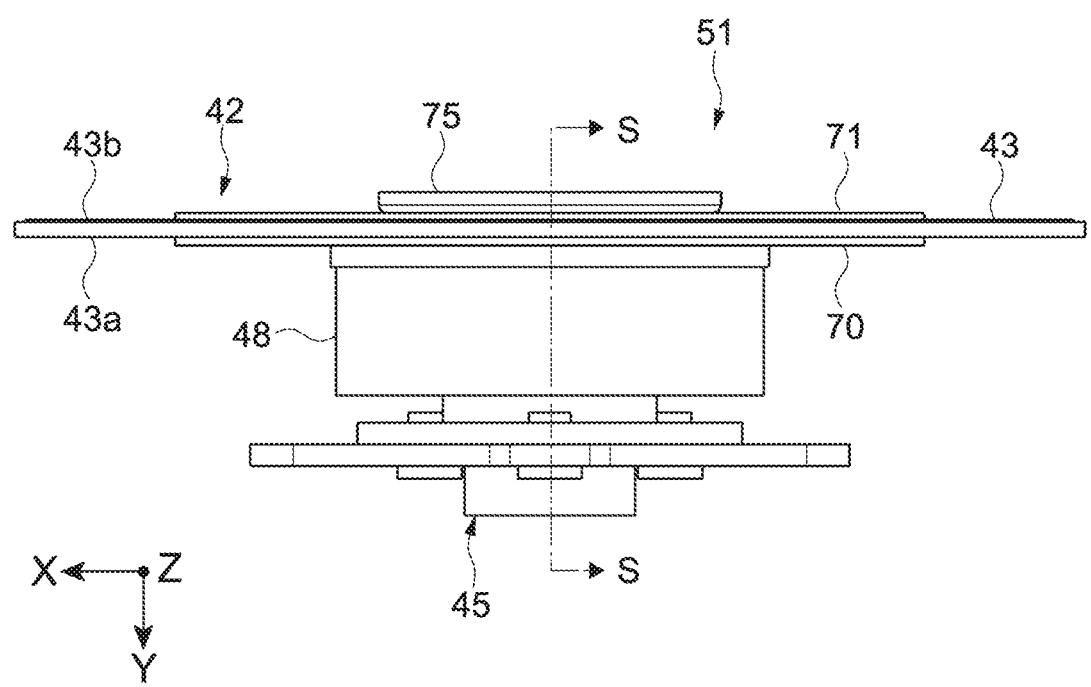
FIG. 8 A plan view of the wheel portion as viewed from the top.
Figure 9A:
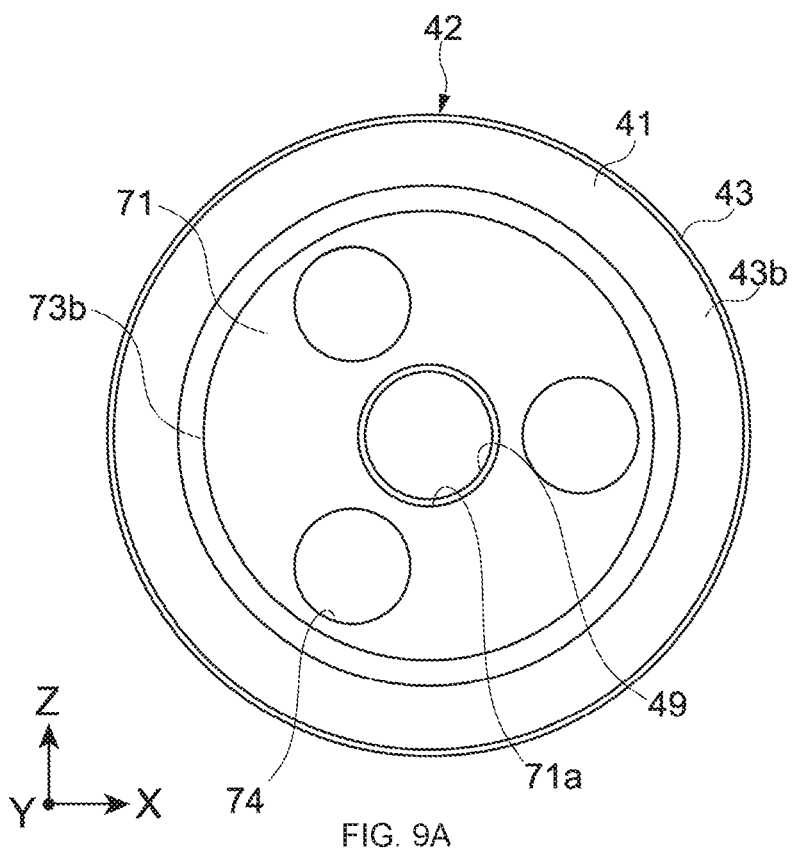
FIGS. 9A and 9B Views of the phosphor wheel as viewed from the front side and the back side.
Figure 9B:
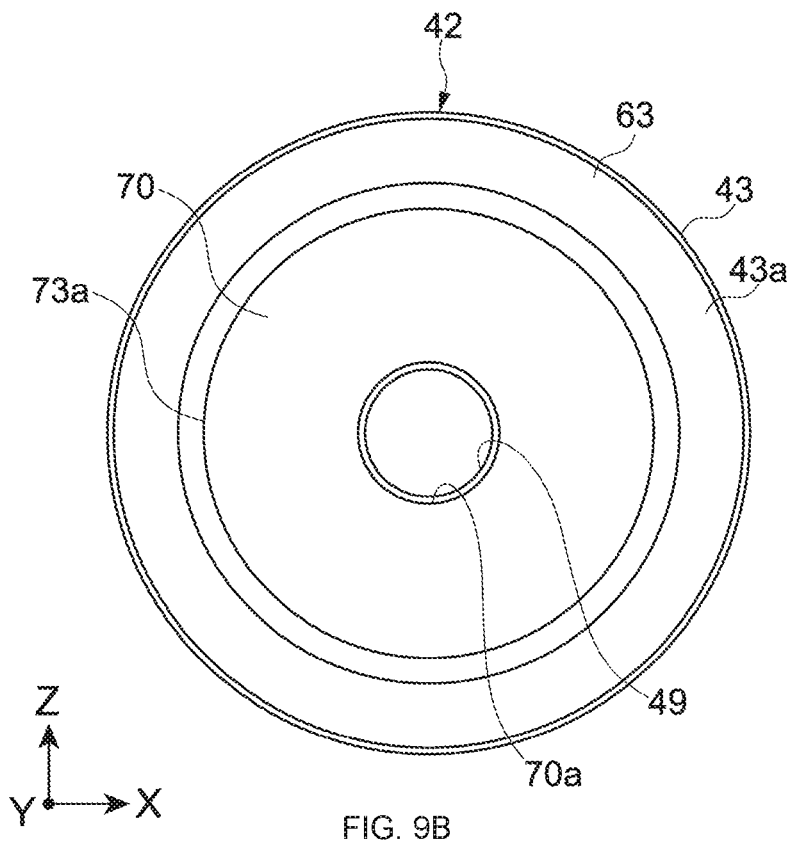

FIG. 7 is a perspective view of the wheel portion 51 as obliquely viewed from the front side. FIG. 8 is a plan view of the wheel portion 51 as viewed from the top. FIGS. 9A and 9B show views of the phosphor wheel 42 as viewed from the front side and the back side. FIG. 9A is a front view and FIG. 9B is a rear view.

Figure 10A:
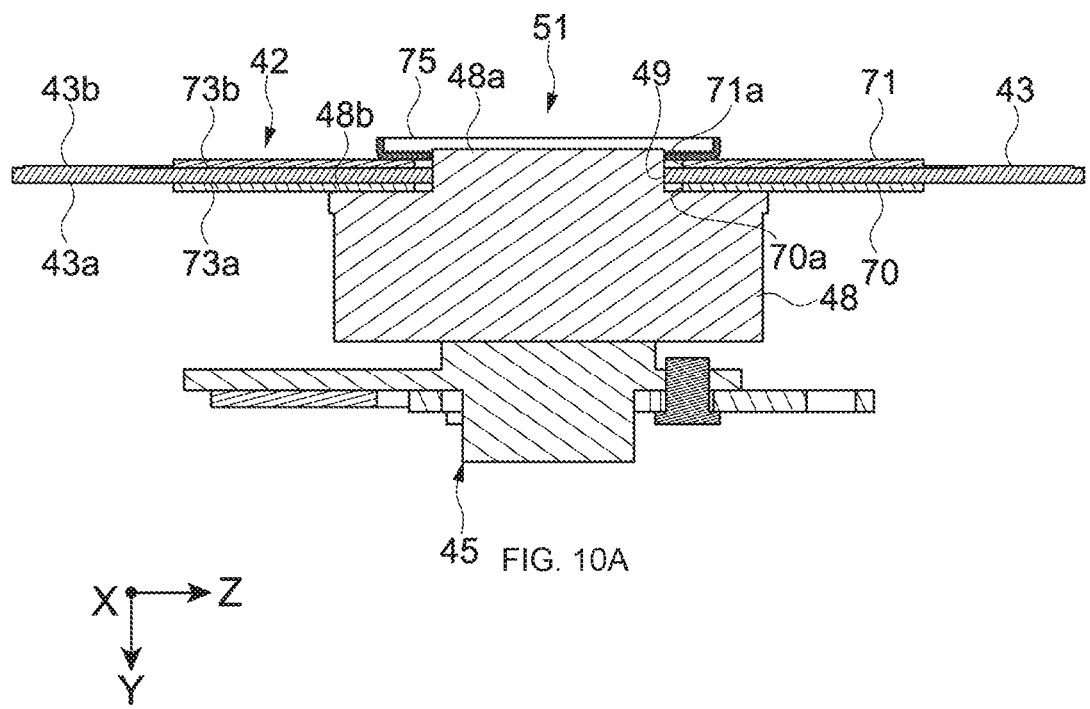
FIGS. 10A and 10B Cross-sectional views showing a cross-section of the wheel portion.
Figure 10B:
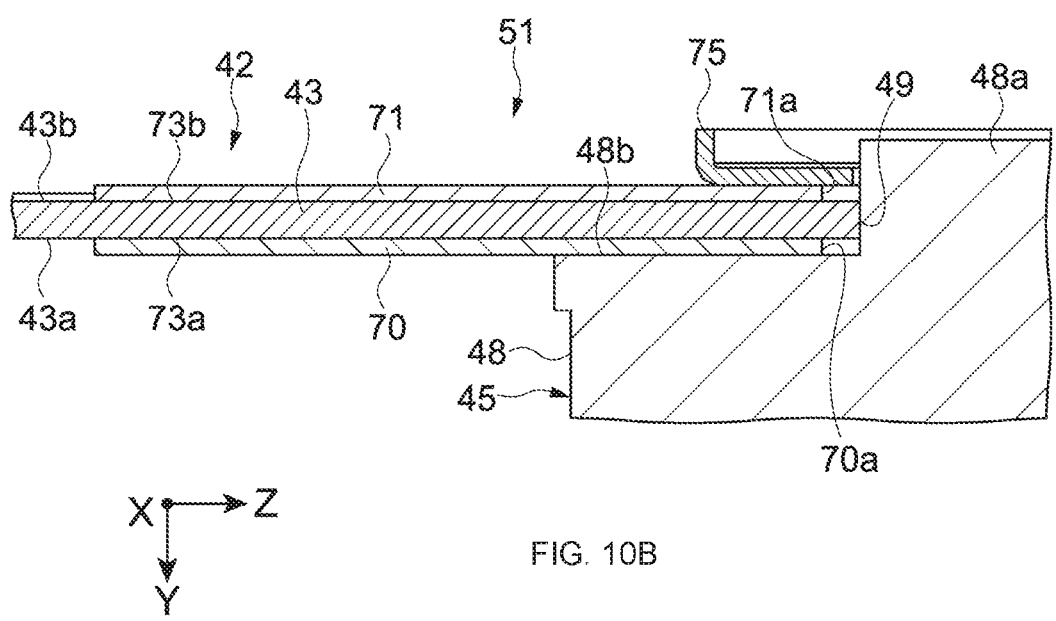

FIGS. 10A and 10B is a cross-sectional view showing a cross-section of the wheel portion 51. FIG. 10A is a cross-section taken along the line S-S shown in FIG. 8 and FIG. 10B is an enlarged view of the cross-sectional view of FIG. 10A.

As shown in FIG. 10A, an insertion hole 49 is formed at the center of the substrate 43 of the phosphor wheel 42. The insertion hole 49 is formed having a hole center at the center of the first surface 43$a$. Note that, in this embodiment, the first and second surfaces 43$a$ and 43$b$ have circular shapes having the same size. Therefore, the center of the first surface 43$a$ coincides with the center of the second surface 43$b$.

In the end of the rotor 48 of the motor 45, a convex portion 48$a$ is formed at the center thereof. A step surface 48$b$ is formed around the convex portion 48$a$. By the convex portion 48$a$ of the rotor 48 being inserted into the insertion hole 49 of the substrate 43, the phosphor wheel 42 is attached to the motor 45.

As shown in FIG. 9A, the phosphor layer 41 is formed in a circumferential portion (inner region near circumference) of the second surface 43$b$ of the substrate 43. As shown in FIG. 9B, the circumferential portion of the first surface 43$a$ on a rear side of the phosphor layer 41 is an irradiation region 63 irradiated with the blue laser light B1.

As described above, the wheel portion 51 includes the rotation member 70 connected to the first surface 43$a$ of the substrate 43 and a contact member 71 connected to the second surface 43$b$. The rotation member 70 is a ring-shaped member having an opening 70$a$ formed at the center thereof. The rotation member 70 is connected to a region surrounded by the irradiation region 63 of the first surface 43$a$ such that the center of the opening 70$a$ approximately coincides with the center of the insertion hole 49 of the substrate 43. Therefore, radiation of the blue laser light B1 to the phosphor layer 41 is not obstructed by the rotation member 70.

As shown in FIGS. 10A and 10B, when the phosphor wheel 42 is attached to the motor 45, the rotation member 70 is connected to the step surface 48$b$ of the rotor 48. Therefore, when the rotor 48 rotates, the rotation member 70 and the substrate 43 integrally rotate due to rotational force thereof.

As shown in FIG. 9A, the contact member 71 is a ring-shaped member having an opening 71$a$ formed at the center thereof. The contact member 71 is connected to a region surrounded by the phosphor layer 41 of the second surface 43$b$ such that the center of the opening 71$a$ approximately coincides with the center of the insertion hole 49 of the substrate 43. Therefore, emission of the white light W from the phosphor layer 41 is not obstructed by the contact member 71.

As shown in FIGS. 9A and 9B, the size and outer shape of the contact member 71 as viewed in the y-axis direction are approximately equal to the size and outer shape of the rotation member 70 as also viewed in the y-axis direction, respectively. Note that the y-axis direction corresponds to a direction of a normal of each of the first and second surfaces 43$a$ and 43$b$.

Further, as shown in FIG. 10A, the contact member 71 is provided at such a position that it overlaps the rotation member 70 as viewed in the y-axis direction. That is, it is assumed that the region to which the rotation member 70 of the first surface 43$a$ is connected is a first region 73$a$ set with the center of the first surface 43$a$ being a reference. Then, the contact member 71 is connected to a second region 73$b$ having a size approximately equal to that of the first region 73$a$ set with the center of the second surface 43$b$ being a reference.

Note that, for connection between the rotor 48 and the rotation member 70, connection between the rotation member 70 and the substrate 43, and connection between the substrate 43 and the contact member 71, a method of connecting the members to each other is not limited. The members are connected with an adhesive, for example.

As shown in FIG. 9A, three through-holes 74 are formed in the contact member 71. The three through-holes 74 are formed at equal intervals of 120 degrees with the center of the second surface 43$b$ being a reference. Due to the formation of those through-holes 74, the number of exposed portions of the phosphor wheel 42 can be increased, and the cooling efficiency can be increased.

As shown in FIGS. 10A and 10B, a rotor hub 75 is attached to the convex portion 48$a$ inserted into the insertion hole 49 of the substrate 43. The rotor hub 75 is a dish-shaped member. A correction material can be placed in a depressed portion thereof. The correction material corrects rotation balance of the phosphor wheel 42. By correcting the rotation balance, the phosphor wheel 42 can be stably rotated. Further, the lifetime of the motor 45 can be prolonged. Note that an adhesive or a weight, for example, is used as the correction material.

Metal materials are typically used for the rotation member 70 and the contact member 71. Specific metal materials to be used for the rotation member 70 and the contact member 71 are selected on the basis of linear expansion coefficients thereof. For example, it is assumed that the linear expansion coefficient of the substrate 43 is a first linear expansion coefficient L1 and the linear expansion coefficient of the rotation member 70 is a second linear expansion coefficient L2. Further, it is assumed that the linear expansion coefficient of the contact member 71 is a third linear expansion coefficient L3.

In this case, the respective materials of the rotation member 70 and the contact member 71 are selected such that a magnitude relationship of the second linear expansion coefficient L2 to the first linear expansion coefficient L1 is equal to a magnitude relationship of the third linear expansion coefficient L3 to the first linear expansion coefficient L1. That is, the respective materials of the rotation member 70 and the contact member 71 are selected such that the following condition is established (hereinafter, this condition referred to as Condition 1).

If L1>L2,L1>L3, or

If L1<L2,L1<L3

Note that the materials that satisfy L1=L2 and L1=L3 are not used (materials having different linear expansion coefficients can be used even if the difference is too small).

For example, in the case where a sapphire glass is used for the substrate 43, the first linear expansion coefficient L1 is about $7.5\times10^{-6}$/K. At this time, metal materials each having a linear expansion coefficient larger than the first linear expansion coefficient L1, such as copper (about $16.8\times10^{-6}$/K), stainless steel ($10.5\times10^{-6}$/K), and nickel ($12.8\times10^{-6}$/K), are used for the rotation member 70 and the contact member 71. With this, Condition 1 above is satisfied. As a matter of course, it is not limited to those materials.

Further, also in the case where metal materials each having a linear expansion coefficient smaller than the first linear expansion coefficient L1 are used for the rotation member 70 and the contact member 71, Condition 1 above is satisfied. Therefore, such a material may be used. Note that the materials used for the rotation member 70 and the contact member 71 are not limited to the metal materials and other materials may be used.

Typically, the rotation member 70 and the contact member 71 are made of the same material. The same material is selected for the rotation member 70 and the contact member 71, and hence Condition 1 is automatically satisfied. Therefore, the rotation member 70 and the contact member 71 can be easily prepared. Further, costs for components can be reduced in comparison with the case where different kinds of materials are used.

When a member obtained by joining two metal plates having different linear expansion coefficients to each other is heated, the member is warped in a direction due to the difference of the linear expansion coefficients. It is a phenomenon that occurs due to stress generated in each metal plate due to the difference of the linear expansion coefficients of the two metal plates, which is called bimetal phenomenon. The direction in which the member is warped depends on the magnitude relationship between the linear expansion coefficients of the two metal plates. The entire member is warped in such a manner that the member having a larger linear expansion coefficient is more largely deformed.

When the phosphor layer 41 is irradiated with the blue laser light B1, heat is generated from the phosphor layer 41. This heat increases the temperature of the phosphor wheel 42. Therefore, due to the difference between the linear expansion coefficients L1 and L2 of the substrate 43 and the rotation member 70, stress which deforms them is generated as in the bimetal phenomenon. Meanwhile, also between the substrate 43 and the contact member 71, stress which deforms them is generated due to the difference between the linear expansion coefficients L1 and L3.

The rotation member 70 and the contact member 71 are connected while sandwiching the substrate 43 therebetween. Further, setting is made such that the magnitude relationship between the first and second linear expansion coefficients L1 and L2 is equal to the magnitude relationship between the first and third linear expansion coefficients L1 and L3. Therefore, directions of deformation of the substrate 43 due to the bimetal effect are opposite to each other. That is, directions of stress generated in the substrate 43 are opposite to each other and cancels each other. As a result, it is possible to suppress deformation of the substrate 43 due to heat generation of the phosphor layer 41.

For example, in a configuration in which the rotor of the motor is merely connected to one surface of the substrate, stress due to the difference between the linear expansion coefficients is generated in the connection portion between different kinds of materials. Therefore, there is a possibility in that the connection portion may be damaged by deformation or warping due to that stress, the phosphor wheel itself may be damaged, and so on. That is, there is a fear that the adhesive of the connection portion may be pealed off and the phosphor wheel may be cracked due to load caused by the difference between the linear expansion coefficients of the substrate and the rotor. For example, in the case where a sapphire glass is used for the substrate, the phosphor wheel is easily damaged.

In contrast, in this embodiment, as described above, it is possible to suppress deformation of the substrate 43 due to heat generation of the phosphor layer 41, and hence it is possible to sufficiently prevent a damage of the phosphor wheel 42, a decrease in reliability regarding the connection to the motor 45, and the like. That is, it becomes possible to prevent the reliability of the phosphor wheel 42 from being lowered due to an increase in temperature. As a result, it is possible to increase the luminance of the blue laser light B1 emitted from the light sources 32 and to increase the luminance of the projector 100.

Further, in this embodiment, as shown in FIGS. 7 to 10A and 10B, each of the substrate 43, the rotation member 70, and the contact member 71 is disposed such that the center of each of the substrate 43, the rotation member 70, and the contact member 71 is positioned on the rotation axis 46 of the motor 45. Further, the sizes and outer shapes of the rotation member 70 and the contact member 71 are approximately equal to each other as viewed in the y-axis direction. In addition, the first region 73a to which the rotation member 70 of the first surface 43a of the substrate 43 is connected and the second region 73b to which the contact member 71 of the second surface 43b is connected are approximately equal to each other.

Therefore, the configurations of the rotation member 70 and the contact member 71 that sandwich the substrate 43 therebetween, for each surface, are approximately equal to each other. As a result, it becomes possible to sufficiently suppress deformation of the substrate 43. Further, the wheel portion 51 constituted of the phosphor wheel 42, the motor 45, the rotation member 70, and the contact member 71 can be easily fabricated.

Note that stress due to the difference of the linear expansion coefficients generated in the substrate 43 differs in a manner that depends on the materials used for the rotation member 70 and the contact member 71. In view of this point, the first region 73a and the second region 73b may be set to have different sizes. For example, a configuration in which the member of the rotation member 70 and the contact member 71 whose difference of the linear expansion coefficient from the substrate 43 is larger is made smaller (connection region is made smaller) and the member whose difference of the linear expansion coefficient from the substrate 43 is smaller is made larger (connection region is made larger) is also possible. That is, the sizes and outer shapes of the rotation member 70 and the contact member 71, the sizes of the first and second regions 73a and 73b, and the like may be appropriately set for effectively suppressing deformation of the substrate 43.

Note that, in the present disclosure, each of the rotation member 70 and the contact member 71 is connected to the phosphor wheel 42 as described above. However, it can also be said that a new phosphor wheel according to the present technology is configured by the substrate 43, the phosphor layer 41, the rotation member 70, and the contact member 71.

Here, it is assumed that the linear expansion coefficient of the rotor 48 of the motor 45 that functions as the applying member is a fourth linear expansion coefficient L4. In this case, the magnitude of the second linear expansion coefficient L2 of the rotation member 70 connected to the rotor 48 may be a magnitude between the first linear expansion coefficient L1 and the fourth linear expansion coefficient L4. That is, the material of the rotation member 70 may be selected such that the following condition is established (hereinafter, this condition will be referred to as Condition 2).

$$L1<L2<L4$$

For example, in the case where a sapphire glass (about $7.5 \times 10^{-6}$/K) is used for the substrate 43 and the material of the rotor 48 is aluminum (about $23 \times 10^{-6}$/K), the rotation member 70 is made of a material having a linear expansion coefficient having a magnitude therebetween. For example, the above-mentioned copper, stainless steel, or nickel satisfies Condition 2.

By selecting the material of the rotation member 70 to satisfy Condition 2, it is possible to reduce the magnitude of stress due to the difference of the linear expansion coefficients, which is generated in the substrate 42, in comparison with the case where the rotor 48 is connected to the substrate 43. As a result, it becomes possible to sufficiently suppress deformation of the substrate 43 due to heat generation of the phosphor layer 41. Note that the material of the contact member 71 may be appropriately selected on the basis of Condition 1 above.

Further, a heat-conductive material may be used for the rotation member 70 and the contact member 71. With this, heat generated from the light-emitter layer 41 can be dissipated to the air through the rotation member 70 and the contact member 71 or can be guided to a predetermined cooling device and the like. As a result, an increase in temperature of the phosphor wheel 42 can be suppressed and the reliability can be kept high. Note that, even if only one of the rotation member 70 and the contact member 71 is made of the heat-conductive material, those effects are provided. Examples of the highly heat-conductive material includes copper and aluminum.

Other Embodiments

The present technology is not limited to the above-mentioned embodiments and various other embodiments can be realized.

Figure 11:
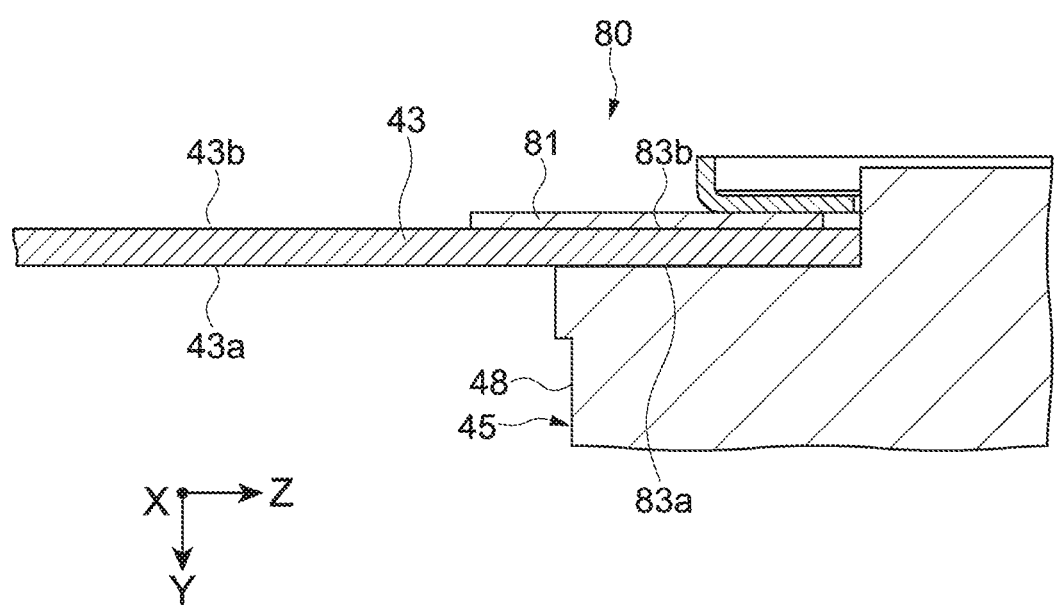
FIG. 11 A cross-sectional view showing a central portion of a wheel portion according to another embodiment.

FIG. 11 is a cross-sectional view showing a central portion of a wheel portion according to another embodiment. In this wheel portion 80, the rotor 48 of the motor 45 is directly connected to the first surface 43a of the substrate 43. That is, in this embodiment, the rotor 48 that is the member that constitutes the motor 45 functions as the rotation member that rotates integrally with the substrate 43.

Also in such a configuration, by connecting a contact member 81 having the linear expansion coefficient L3 satisfying Condition 1 above to the second surface 43b of the substrate 43, it becomes possible to sufficiently suppress deformation of the substrate 43 due to heat generation of the phosphor layer.

For example, in the case where a sapphire glass (about $7.5 \times 10^{-6}$/K) is used for the substrate 43 and the material of the rotor 48 is aluminum (about $23 \times 10^{-6}$/K), aluminum is used for the contact member 81, though not limited thereto. A material whose linear expansion coefficient is larger than that of the sapphire glass only needs to be appropriately used. The size of a first region 83a to which the rotor 48 of the first surface 43a of the substrate 43 is connected and the size of a second region 83b to which the contact member 81 of the second surface 43b is connected may be set to be equal to each other. Alternatively, the second region 83b may be set to be larger than the first region 83a as shown in FIG. 11.

Figure 12A:
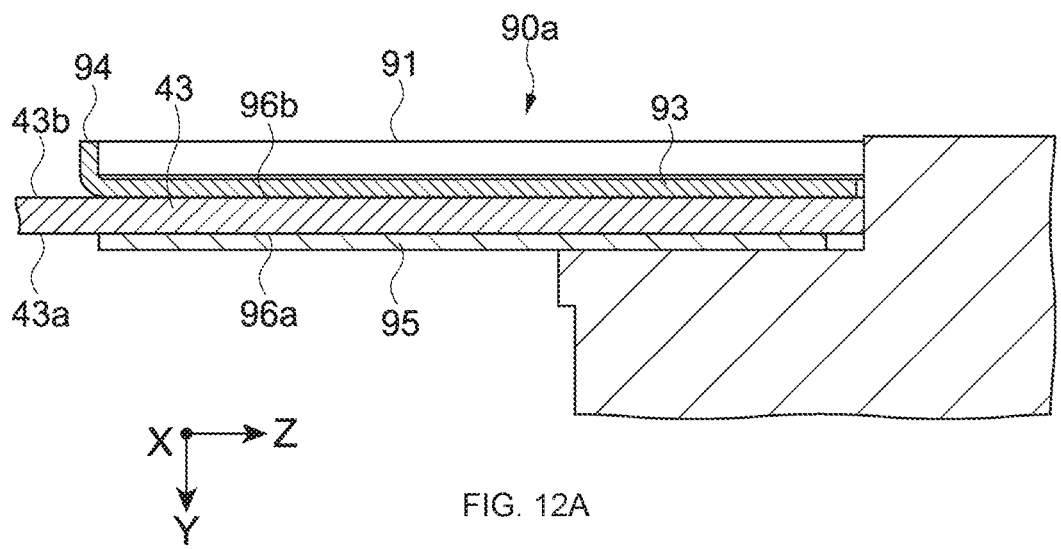
FIGS. 12A and 12B Cross-sectional views showing a central portion of a wheel portion according to another embodiment.
Figure 12B:
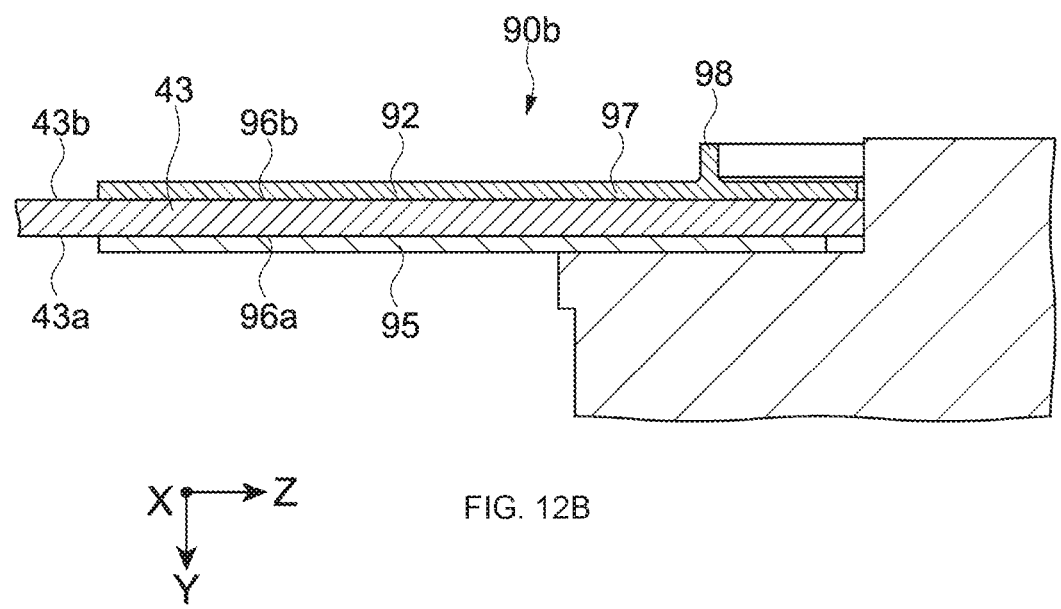

FIGS. 12A and 12B are cross-sectional views showing a central portion of a wheel portion according to another embodiment. Regarding wheel portions 90a and 90b shown in FIGS. 12A and 12B, contact members 91 and 92 connected to the second surface 43b of the substrate 43 are used as rotor hubs.

A contact member 91 shown in FIG. 12A includes a bottom surface portion 93 and a side wall portion 94. The bottom surface portion 93 is connected to the second surface 43b and has a circular shape. The side wall portion 94 extends from a periphery of the bottom surface portion 93 in the y-direction. As viewed in the y-axis direction, the size and outer shape of the bottom surface portion 93 of the contact member 91 are approximately equal to the size and outer shape of a rotation member 95 connected to the first surface 43a, respectively. Further, a second region 96b to which the bottom surface portion 93 of the second surface 43b of the substrate 43 is connected and a first region 96a to which the rotation member 95 of the first surface 43a is connected have an approximately equal size, though not limited to this configuration as a matter of course.

A contact member 92 shown in FIG. 12B includes a planar surface portion 97 and a wall portion 98. The planar surface portion 97 is connected to the second surface 43b and has a circular shape. The wall portion 98 is formed at a position at a predetermined distance from the center of the planar surface portion 97 and extends in the y-direction. The wall portion 98 has a ring-shape as viewed in the y-axis direction. An inner side of the wall portion 98 (side toward the center of the planar surface portion) is a region in which the correction material that corrects the rotation balance is placed.

As shown in FIG. 12B, as viewed in the y-axis direction, the size and outer shape of the planar surface portion 97 of the contact member 92 are approximately equal to the size and outer shape of the rotation member 95 connected to the first surface 43a, respectively. Further, the second region 96b to which the planar surface portion 97 of the second surface 43b of the substrate 43 is connected and the first region 96a to which the rotation member 95 of the first surface 43a is connected have an approximately equal size.

Due to the use of the contact members 91 and 92 as the rotor hubs as shown in FIGS. 12A and 12B, it is possible to reduce the number of components necessary for configuring the wheel portions 91 and 91b. As a result, it becomes possible to reduce the costs for components. Further, it is possible to simplify the configuration.

Hereinabove, the outer rotor type motor has been used, though not limited thereto. The present technology is applicable also in the case where an inner motor type motor is used. For example, the motor 45 shown in FIG. 5 is replaced by the inner motor type motor. That is, due to rotation of a rotor inside the motor 45, a shaft portion 45a connected to the rotor is rotated.

To the shaft portion 45a, connected is a rotation member 130 according to the present technology. The rotation member 130 is connected to a surface 131 of the substrate 43 on the front side (this surface is the first surface unlike the above embodiment). When the motor 45 is driven, the rotation member 130 and the substrate 43 integrally rotate. In such a configuration, for example, a contact member 133 (shown by the long dashed short dashed line) is connected to a second surface 132 opposite to a first surface 131, overlapping the rotation member 130. With this, the wheel portion according to the present technology is configured and the various effects discussed above are provided.

Hereinabove, a transmissive phosphor wheel has been used. However, the present technology is applicable also in the case where a reflective phosphor wheel is used. The rotation member that rotates due to rotational force generated by the motor is connected to the first surface of the substrate of the phosphor wheel. Then, the contact member made of the material satisfying Condition 1 above is connected to the second surface of the substrate. With this, the wheel portion according to the present technology can be configured.

Hereinabove, the yellow light is generated from the phosphor layer, using the blue laser light as the excitation light. However, the wavelength regions of the excitation light and fluorescence generated by excitation are not limited.

At least two feature parts of the above-mentioned feature parts according to the present technology can also be combined. That is, the various feature parts described in each of the embodiments may be arbitrarily combined without distinction of the embodiments. Further, various effects described above are merely examples and not limitative and other effects may be provided.

Note that the present technology may also take the following configurations.

(1) A light source apparatus, including:
  a wheel including
    a light emitter that is excited by excitation light and emits visible light, and
    a base that includes a first surface and a second surface opposite thereto, supports the light emitter on either one of the first and second surfaces, and has a first linear expansion coefficient;
  a motor that generates rotational force for rotating the base;
  a rotation member that is connected to the first surface of the base, rotates integrally with the base due to the rotational force of the motor, and has a second linear expansion coefficient different from the first linear expansion coefficient; and
  a contact member that is connected to the second surface of the base and has a third linear expansion coefficient whose magnitude relationship to the first linear expansion coefficient is equal to a magnitude relationship of the second linear expansion coefficient to the first linear expansion coefficient.

(2) The light source apparatus according to (1), further including:
  a light source that emits light; and
  an emitting surface that emits combination light including emission light from the light source and visible light from the light emitter, in which
  the light emitter emits the visible light, using part of the emission light from the light source as the excitation light.

(3) The light source apparatus according to (1) or (2), in which
  the motor includes an applying member that applies the rotational force by rotating and has a fourth linear expansion coefficient, and
  the rotation member is connected to the applying member and has the second linear expansion coefficient that is a magnitude between the first linear expansion coefficient and the fourth linear expansion coefficient.

(4) The light source apparatus according to (1) or (2), in which
  the rotation member is a member that constitutes the motor.

(5) The light source apparatus according to any one of (1) to (4), in which
  the rotation member and the contact member are made of the same material.

(6) The light source apparatus according to any one of (1) to (5), in which
  each of the base, the rotation member, and the contact member is disposed such that a center of each of the base, the rotation member, and the contact member is positioned on a rotation axis of the motor.

(7) The light source apparatus according to any one of (1) to (6), in which
  the rotation member is connected to a first region set with the center of the first surface being a reference, and
  the contact member is connected to a second region set with the center of the second surface being a reference, the second region having a size approximately equal to the first region.

(8) The light source apparatus according to any one of (1) to (7), in which
  a size and an outer shape of the rotation member as viewed in a direction of a normal of the first surface are approximately equal to a size and an outer shape of the contact member as viewed in a direction of a normal of the second surface, respectively.

(9) The light source apparatus according to any one of (1) to (8), in which
  the contact member is a rotor hub in which a correction material that corrects rotation balance of the wheel is capable of being placed.

(10) The light source apparatus according to any one of (1) to (9), in which
  at least one of the rotation member and the contact member is heat conductive.

REFERENCE SIGNS LIST

L1 first linear expansion coefficient
L2 second linear expansion coefficient
L3 third linear expansion coefficient
L4 fourth linear expansion coefficient
32 laser light source
42 phosphor layer
42 phosphor wheel
43 substrate
43a, 131 first surface
43b, 132 second surface
45 motor
51, 80, 91a, 91b wheel portion
54 emitting surface
70, 95, 130 rotation member
71, 81, 91, 92, 133 contact member
73a, 83a, 96a first region
73b, 83b, 96b second region
75 rotor hub
100 light source apparatus
200 image generator system 400 projection system
500 image display apparatus

The invention claimed is:
1. A light source apparatus, comprising:
a wheel that comprises:
a light emitter configured to:
receive excitation light; and
emit visible light based on the received excitation light; and
a base that includes a first surface and a second surface, wherein
the second surface is opposite to the first surface,
the base supports the light emitter on one of the first surface or the second surface, and
the base has a first linear expansion coefficient;
a motor configured to:
generate rotational force; and
rotate the base based on the generated rotational force;
a rotation member configured to rotate with the base based on the generated rotational force, wherein
the rotation member is connected to the first surface,
the rotation member has a second linear expansion coefficient, and
the second linear expansion coefficient is different from the first linear expansion coefficient; and
a contact member, wherein
the contact member is connected to the second surface,
the contact member has a third linear expansion coefficient,
a first magnitude relationship between the third linear expansion coefficient and the first linear expansion coefficient, and a second magnitude relationship between the second linear expansion coefficient and the first linear expansion coefficient are one of
the first magnitude relationship that the first linear expansion coefficient is greater than the third linear expansion coefficient, and the second magnitude relationship that the first linear expansion coefficient is greater than the second linear expansion coefficient, or
the first magnitude relationship that the first linear expansion coefficient is less than the third linear expansion coefficient, and the second magnitude relationship that the first linear expansion coefficient is less than the second linear expansion coefficient,
the contact member includes a plurality of through holes, and
each through hole of the plurality of through holes is at a specific interval from a center of the second surface.
2. The light source apparatus according to claim 1, further comprising:
a light source configured to emit emission light; and
an emitting surface configured to emit combination light, wherein
the combination light comprises the emission light and the visible light, and
the emission light comprises the excitation light.
3. The light source apparatus according to claim 1, wherein
the motor includes an applying member,
the applying member is configured to apply the generated rotational force to the base,
the applying member has a fourth linear expansion coefficient,
the rotation member is connected to the applying member, and
a magnitude of the second linear expansion coefficient is greater than a magnitude of the first linear expansion coefficient and the magnitude of the second linear expansion coefficient is smaller than a magnitude of the fourth linear expansion coefficient.
4. The light source apparatus according to claim 1, wherein the motor comprises the rotation member.
5. The light source apparatus according to claim 1, wherein a material of the rotation member is same as a material of the contact member.
6. The light source apparatus according to claim 1, wherein a center of each of the base, the rotation member, and the contact member is on a rotation axis of the motor.
7. The light source apparatus according to claim 1, wherein
the rotation member is connected to a first region of the first surface,
the first region is set with a center of the first surface,
the contact member is connected to a second region of the second surface,
the second region is set with the center of the second surface, and
a size of the second region is approximately equal to a size of the first region.
8. The light source apparatus according to claim 1, wherein a size and an outer shape of the rotation member viewable in a direction normal to the first surface is approximately equal to a respective size and a respective outer shape of the contact member viewable in a direction normal to the second surface, respectively.
9. The light source apparatus according to claim 1, wherein
the contact member is a rotor hub,
a correction material is placed in the rotor hub, and
the correction material is configured to correct rotation balance of the wheel.
10. The light source apparatus according to claim 1, wherein at least one of the rotation member or the contact member is heat conductive.
11. An image display apparatus, comprising:
a light source apparatus that comprises:
a wheel that comprises:
a light emitter configured to:
receive excitation light; and
emit visible light based on the received excitation light, and
a base that includes a first surface and a second surface, wherein
the second surface is opposite to the first surface,
the base supports the light emitter on one of the first surface or the second surface, and
the base has a first linear expansion coefficient;
a motor configured to:
generate rotational force; and
rotate the base based on the generated rotational force;
a rotation member configured to rotate with the base based on the generated rotational force, wherein
the rotation member is connected to the first surface,
the rotation member has a second linear expansion coefficient, and
the second linear expansion coefficient is different from the first linear expansion coefficient;
a contact member, wherein the contact member is connected to the second surface, the contact member has a third linear expansion coefficient, a first magnitude relationship between the third linear expansion coefficient and the first linear expansion coefficient, and a second magnitude relationship between the second linear expansion coefficient and the first linear expansion coefficient are one of the first magnitude relationship that the first linear expansion coefficient is greater than the third linear expansion coefficient, and the second magnitude relationship that the first linear expansion coefficient is greater than the second linear expansion coefficient, or the first magnitude relationship that the first linear expansion coefficient is less than the third linear expansion coefficient, and the second magnitude relationship that the first linear expansion coefficient is less than the second linear expansion coefficient, the contact member includes a plurality of through holes, and each through hole of the plurality of through holes is at a specific interval from a center of the second surface; and an emitting surface configured to emit combination light, wherein the combination light comprises the visible light;

an image generation system that comprises:

an image generation element configured to generate an image based on the emitted visible light, and an illumination optical system configured to irradiate the image generation element with the emitted visible light; and a projection system configured to project the generated image.

12. An optical unit, comprising:

a wheel that comprises:

a light emitter configured to:

receive excitation light; and emit visible light based on the received excitation light, and a base that includes a first surface and a second surface, wherein the second surface is opposite to the first surface, the base supports the light emitter on one of the first surface or the second surface, and the base has a first linear expansion coefficient;

a motor configured to:

generate rotational force; and rotate the base based on the generated rotational force;

a rotation member configured to rotate with the base based on the generated rotational force, wherein the rotation member is connected to the first surface, the rotation member has a second linear expansion coefficient, and the second linear expansion coefficient is different from the first linear expansion coefficient; and a contact member, wherein the contact member is connected to the second surface, the contact member has a third linear expansion coefficient, a first magnitude relationship between the third linear expansion coefficient and the first linear expansion coefficient, and a second magnitude relationship between the second linear expansion coefficient and the first linear expansion coefficient are one of the first magnitude relationship that the first linear expansion coefficient is greater than the third linear expansion coefficient, and the second magnitude relationship that the first linear expansion coefficient is greater than the second linear expansion coefficient, or the first magnitude relationship that the first linear expansion coefficient is less than the third linear expansion coefficient, and the second magnitude relationship that the first linear expansion coefficient is less than the second linear expansion coefficient, the contact member includes a plurality of through holes, and each through hole of the plurality of through holes is at a specific interval from a center of the second surface.

* * * * *